United States Patent
Friedrichs et al.

(10) Patent No.: US 7,689,372 B2
(45) Date of Patent: Mar. 30, 2010

(54) PROCESS FOR OPERATING A MEASUREMENT DEVICE OF THE VIBRATION TYPE

(75) Inventors: Rene Friedrichs, Rosdorf (DE); Lothar Deppe, Goettingen (DE); Steffen Keller, Constance (DE); Joerg Gebhardt, Mainz (DE); Frank Kassubek, Rheinfelden (DE)

(73) Assignee: ABB Patent GmbH, Ladenburg (DE)

( * ) Notice: Subject to any disclaimer, the term of this patent is extended or adjusted under 35 U.S.C. 154(b) by 285 days.

(21) Appl. No.: 11/955,675

(22) Filed: Dec. 13, 2007

(65) Prior Publication Data
US 2008/0141787 A1    Jun. 19, 2008

(30) Foreign Application Priority Data
Dec. 13, 2006  (DE)  .................. 10 2006 058 732
Dec. 11, 2007  (DE)  .................. 10 2007 059 804

(51) Int. Cl.
*G01F 1/00*  (2006.01)
(52) U.S. Cl. ..................................... 702/56
(58) Field of Classification Search ............ 702/56, 702/45, 50, 54, 76, 79, 41, 85, 106, 127, 702/142, 109, 110, 112, 113, 124; 73/570, 73/861.18
See application file for complete search history.

(56) References Cited

U.S. PATENT DOCUMENTS

| | | | | |
|---|---|---|---|---|
| 5,987,999 | A * | 11/1999 | VanCleve et al. | 73/861.357 |
| 7,403,862 | B2 * | 7/2008 | Budmiger et al. | 702/45 |
| 7,441,469 | B2 * | 10/2008 | Shelley et al. | 73/861.355 |
| 7,555,397 | B2 * | 6/2009 | Roost et al. | 702/89 |
| 2005/0011286 | A1 | 1/2005 | Storm | |
| 2005/0228598 | A1 * | 10/2005 | Matt | 702/45 |
| 2007/0095152 | A1 * | 5/2007 | Bitto et al. | 73/861.355 |
| 2007/0095153 | A1 * | 5/2007 | Rieder et al. | 73/861.356 |
| 2007/0137313 | A1 * | 6/2007 | Rieder et al. | 73/861.357 |

(Continued)

FOREIGN PATENT DOCUMENTS

EP    1 496 341 (A2)    1/2005

OTHER PUBLICATIONS

Enoksson et al., "A silicon resonant sensor structure for Coriolis mass-flow measurements", Jun. 1997, vol. 6, pp. 119-125.*

*Primary Examiner*—Michael P. Nghiem
*Assistant Examiner*—Cindy H Khuu
(74) *Attorney, Agent, or Firm*—Buchanan Ingersoll & Rooney PC

(57) ABSTRACT

A process is disclosed for operating a measurement device of the vibration type in which at least one exciter arrangement excites the system to vibration and from the vibration parameters, a measurement quantity of a measurement medium in a tube system is determined. A time-dependent force $f(t)=F\sin(\omega t)+g(t)$ with at least one sinusoidal component with an adjustable frequency $\omega$ can be used which acts on at least one vibration-capable part of the measurement device of the vibration type. A response signal of the vibration-capable part, (e.g., its time dependent velocity $v(t)=V\sin(\omega t+\psi)+h(t)$) can be measured, and a phase shift $\Psi$ between the response signal and the force f of a signal component which oscillates with a frequency $\omega$ is determined. The phase shift $\Psi$ can be used as the input for a frequency controller so that the excitation frequency is automatically adjusted as a function of $\Psi$.

17 Claims, 2 Drawing Sheets

U.S. PATENT DOCUMENTS

2007/0180929 A1* 8/2007 Rieder et al. ............. 73/861.17
2007/0186686 A1* 8/2007 Drahm et al. ........... 73/861.357
2008/0229846 A1* 9/2008 Grotzer ................... 73/861.18
2008/0281535 A1* 11/2008 Rensing et al. ............... 702/56
2009/0211373 A1* 8/2009 Matt ..................... 73/861.356

* cited by examiner

PROCESS FOR OPERATING A MEASUREMENT DEVICE OF THE VIBRATION TYPE

CROSS REFERENCE TO RELATED APPLICATIONS

The present application claims priority under 35 U.S.C. §119 to German Application Nos. 10 2006 058 732.4 filed Dec. 13, 2006, and 10 2007 059 804.3 filed in the German Patent Office on Dec. 11, 2007, the contents of which are hereby incorporated by reference in their entireties.

BACKGROUND

1. Field

A process for operating a measurement device of the vibration type is disclosed.

2. Background Information

A measurement device of the vibration type is also known as a Coriolis measurement device in which a measurement tube through which the measurement medium flows is excited to vibrations. With a measurement device of the vibration type, the flow rate of a fluid medium flowing through a measurement tube can be measured. Other parameters of the medium, such as for example the viscosity or the density of the medium, can also be measured, either to supplement the flow rate or alone.

Vibration generators are used in the indicated measurement device of the vibration type. These vibration generators are based on an accurate measurement of at least one natural frequency of the vibration system.

In this connection mechanical transducers are used. This system is known from EP 1496341 A2, the contents of which are incorporated herein by reference in their entirety.

When used in a measurement device of the vibration type, the vibrating system relates to pipelines through which the medium to be measured flows. In this way the natural vibration of the vibrating system changes of course, and is thus dependent on the flow rate and the density of the liquid. But here it also holds that the amplitude of the measured vibration signal is maximum when the vibration system is excited to its natural frequency.

In a known measurement device of the vibration type, the measured vibration signal is amplified and fed back to the exciter arrangement. The measured vibration signal can be noisy in this connection so that frequency instabilities and other unwanted nonlinear effects can occur.

SUMMARY

A process is disclosed for operating a measurement device of the vibration type so that it can be excited optimally with one of its natural frequencies. An exemplary process for operating a measurement device of the vibration type, includes exciting a system to vibration using an adjustable excitation frequency $\omega$ of at least one exciter arrangement; and determining from vibration parameters, a measurement quantity of a measurement medium (e.g., a fluid) of the system. In exemplary embodiments, a time-dependent force $f(t)=F \sin(\omega t)+g(t)$ with at least one sinusoidal component having a force amplitude F, the adjustable excitation frequency $\omega$, and with a possible extraneous time varying force factor $g(t)$ (e.g., spurious force of possibly negligible value and little or no influence on $f(t)$), acts on at least one vibration-capable part (e.g., a tube, such as a tube containing the measurement medium) of the measurement device and is driven (e.g., driven sufficient to initiate detectable vibration of the vibration-capable part) using the exciter arrangement. A response signal of the vibration-capable part is measured and a phase shift $\Psi$ between the response signal and the force f of a signal component which oscillates with a frequency $\omega$ is determined. The phase shift $\Psi$ can be used as an input for a frequency controller so that the excitation frequency is automatically adjusted changed as a function of $\Psi$.

BRIEF DESCRIPTION OF THE DRAWINGS

In the drawings, exemplary embodiments are shown wherein like elements have like reference numbers; however, additional embodiments and advantages will be apparent to those skilled in the art upon reading the detailed description.

$$\psi \approx \arctan\left[\frac{2}{d}(\omega_{0i} - \omega)\right];$$

and

Figure 3:
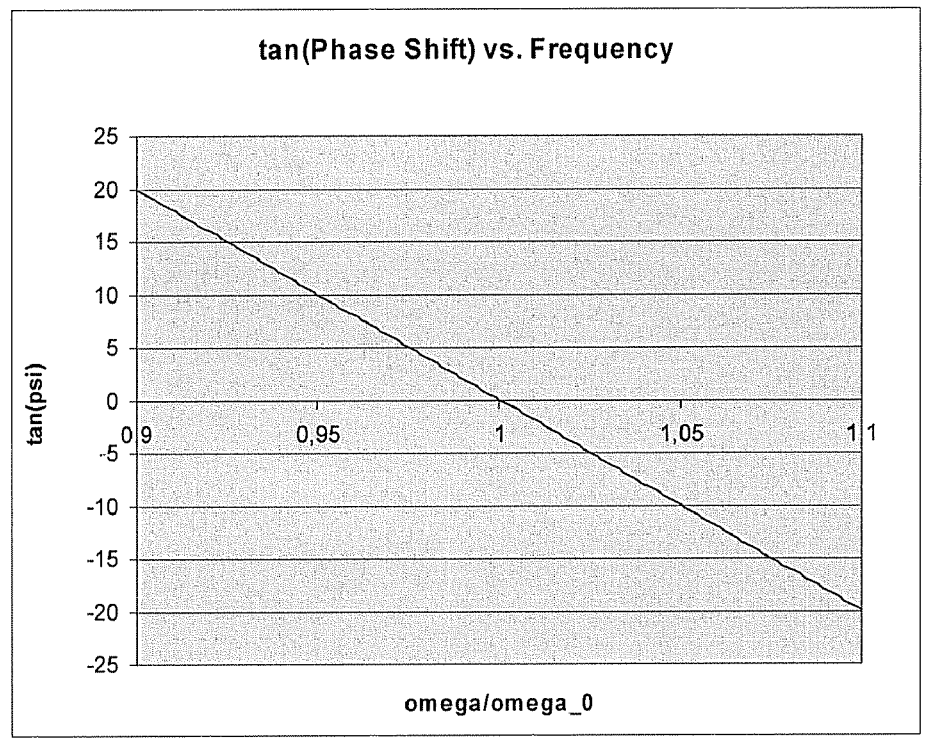

FIG. 3 shows a functional relationship between $\tan(\psi)$ and a frequency which has been held.

DETAILED DESCRIPTION

An exemplary process disclosed herein can use a time-dependent force $f(t)=F \sin(\omega t)+g(t)$ with at least one sinusoidal component having a force amplitude F. The force F can be a constant for a given measurement which can, if desired, be adjusted by actuation of a force actuator acting on a portion of the system, such as a flow tube configured to contain a measurement medium. The force $f(t)$ includes an adjustable frequency $\omega$ stimulated by an exciter arrangement. The force $f(t)$ can also include a possible extraneous time varying force factor $g(t)$, such as a spurious force. This spurious force can, in some cases, be considered negligible or non-existent (e.g., value of 0) in terms of its influence on the force $f(t)$. The force $f(t)$ acts on at least one vibration-capable part (e.g., flow tube or other related device) of a measurement device of the vibration type. A response signal of the vibration-capable part can be measured. For example, a time dependent velocity $v(t)=V \sin(\omega t+\psi)+h(t)$, with at least one sinusoidal component having a velocity amplitude V, the adjustable excitation frequency $\omega$, and with a possible extraneous time varying velocity factor $h(t)$ can be measured. The velocity constant V can be adjusted in response to changes in F, for a given measurement. The phase shift $\Psi$ between the response signal and the force f of the signal component which oscillates with a frequency $\omega$ can be determined. The phase shift $\Psi$ can be used as an input for a frequency controller so that the excitation frequency is automatically adjusted as a function of $\Psi$.

In this way the system, with respect to its vibration excitation, can be adapted to altered natural frequencies (i.e., eigenfrequencies) of the system.

In another exemplary embodiment configuration, the frequency controller is operated in the sense of a PID control.

In another exemplary embodiment, the PID controller is operated in the following sense:

$$\omega_{t+\Delta t} = \omega_t + \Delta\omega$$

with $$\Delta\omega = P*m(\psi_t) + I*\sum_{\tau}^{t-\Delta t} m(\psi_\tau) + D*[m(\psi_t) - m(\psi_{t-\Delta t})]$$

wherein P, I And D are constants which can be determined empirically, in known fashion, and tuned from initial values based on feedback.

Figure 1:
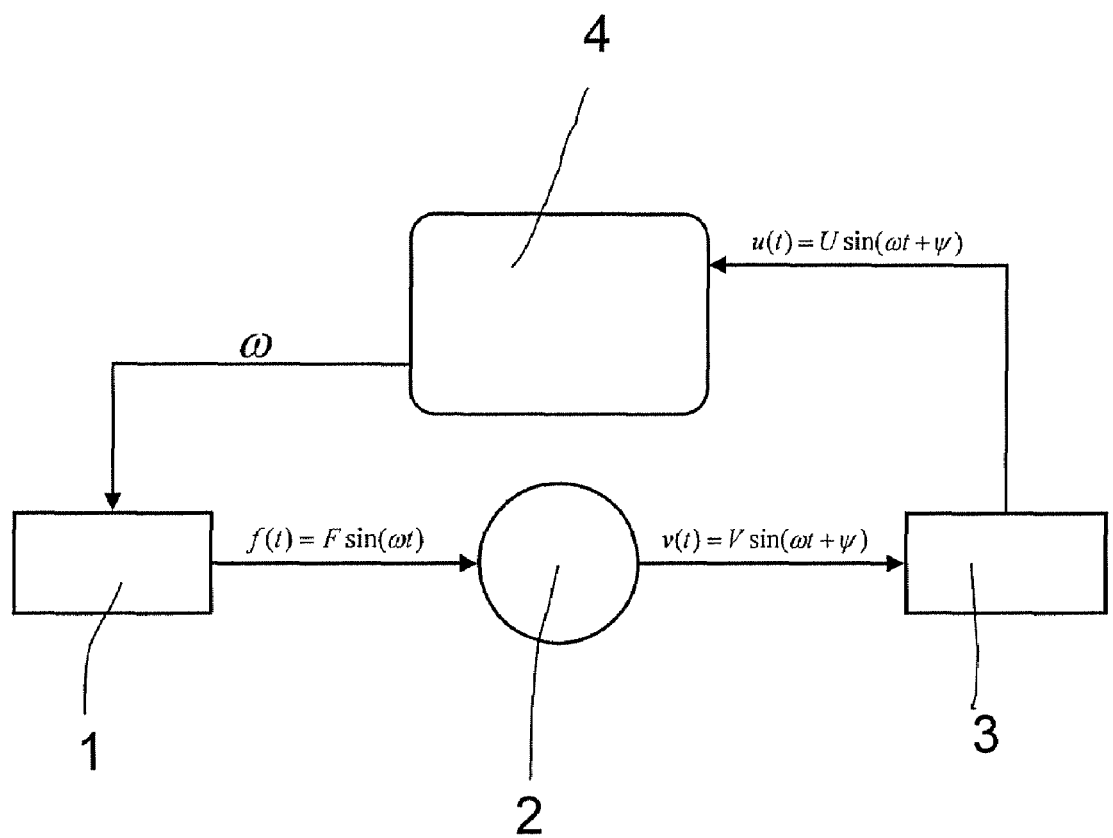
FIG. 1 shows a diagram of an exemplary process disclosed herein.

According to the exemplary process diagram as shown in FIG. 1, there is an exciter arrangement 1 with an adjustable frequency $\omega$. It produces the time-dependent force f(t) which acts on the vibration-capable part 2 of the measurement device of the vibration type. The part 2 could be, for example, the measurement tube for containing the measurement medium.

The vibration-capable part 2 can be a flow tube of a system subject to vibration force f(t). The response signal of the vibration-capable part 2 (e.g., its time-dependent velocity v(t)), can be measured in a sensor 3, the phase shift $\Psi$ between the velocity v(t) and the force f(t) being determined in the sensor 3 or in any desired location.

The phase shift $\Psi$ is used as the input of a frequency control, or controller 4. The controller 4 can include a processor for controlling $\omega$ in response to a frequency control signal u(t). The processor can, for example, implement an algorithm, which depending of the input $\Psi$, changes the frequency $\omega$ with which the exciter arrangement 1 excites the vibration-capable part 2 as described below.

In an exemplary embodiment, it is indicated that a mathematical function m($\psi$) is used as the FIG. 1 input u(t) for frequency control 4 so that the excitation frequency of the vibration system is automatically changed as a function of $\Psi$.

The mathematical function can be mapping of real numbers into real numbers and can be chosen such that frequency control 4 converges to one of its natural frequencies $\omega_{0i}$ of the system subject to the vibration force f(t).

One choice for the desired convergence for any natural frequency is, for example, the very simple function m($\Psi$)=$\Psi$ to the extent it is known that according to the theory of harmonic oscillation the driving force f(t) and the velocity v(t) are exactly in phase with the resonant frequency $\omega = \omega_{0i}$. It follows therefrom that $\Psi$=0.

One simple model for the vibration v(t)=ẋ(t) of the excited part of the measurement device is given by the equation of motion:

$$\ddot{x}(t) + d*\dot{x}(t) + \omega_{0i}^2*x(t) = b*F*\sin(\omega t)$$

The points in agreement with the physical convention indicate the respective degree of the derivative according to time, and d and b are model parameters.

A solution of the equation known for this purpose is:

$$v(t) = V\sin(\omega t + \psi),$$

with $$V = \frac{bF}{d}\cos(\psi) \text{ and } \psi \approx \arctan\left[\frac{2}{d}(\omega_{0i} - \omega)\right].$$

Figure 2:
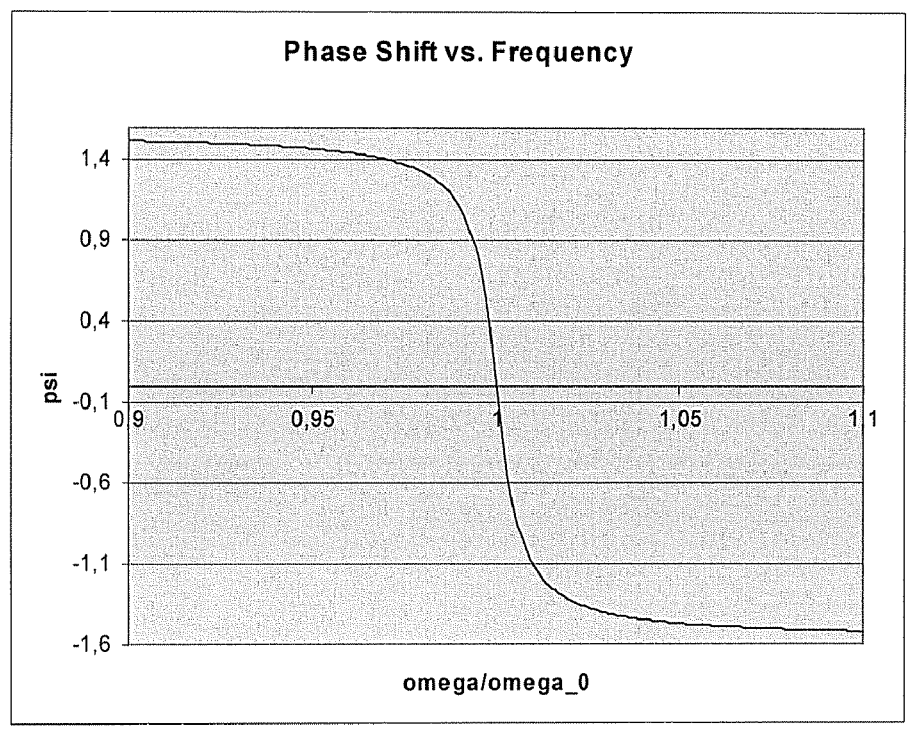
FIG. 2 shows a functional relationship.

FIG. 2 shows the functional relationship:

$$\psi \approx \arctan\left[\frac{2}{d}(\omega_{0i} - \omega)\right].$$

This indicates that each natural frequency $\omega_{0i}$ of the measurement device is a fixed point in the frequency controller 4 when the function m($\psi$) has the property m(0)=0.

Because this relation between the phase shift $\psi$ and the frequency $\omega$ is highly nonlinear, the convergence of the suggested frequency controller can be significantly improved if the function m($\psi$) has suitable nonlinearities.

One exemplary nonlinear mapping is m($\psi$)=tan($\psi$).

With this function the relation between the input of the frequency controller tan($\Psi$) and the controlled property, i.e., the frequency which has been held, is then linear over a wide range of operated frequencies, as is shown in FIG. 3.

In an exemplary embodiment for the frequency controller 4, each input of the frequency controller m($\psi_1$) is computed from the sampled data of the force f(t) and the velocity v(t) in the time interval (t−Δt,t), Δt being much larger than the sampling time.

In an exemplary embodiment, m($\psi_1$) is the average of m($\psi$) in the interval [t−Δt, t] and Δt is a multiple of the period 2$\pi$/$\omega$ of the sinusoidal vibrations generated by the exciter arrangement 1.

Another possible implementation for the frequency controller 4 is the already mentioned PID controller. It can be operated in the following sense:

$$\omega_{t+\Delta t} = \omega_t + \Delta\omega$$

with $$\Delta\omega = P*m(\psi_t) + I*\sum_{\tau}^{t-\Delta t} m(\psi_\tau) + D*[m(\psi_t) - m(\psi_{t-\Delta t})]$$

wherein P, I and D will be understood by those skilled in the art to constitute constants which can be empirically determined, and then tuned from initial values using feedback.

Some of the parameters of the PID controller can also become zero, for example the I-portion and/or the D-portion, so that, for example, a P or purely PI controller can be used as the frequency controller 4.

In another exemplary embodiment, the frequency controller 4 can be either a neural network based on so-called fuzzy logic, or can be implemented in the manner of an actuator.

The exciter arrangement 1 can be a plunger coil. In this case the current can be controlled in the coil, and thus the force applied to the vibration-capable part 2 can be controlled.

The sensor 3 can also be a plunger coil and in this case an induced voltage can be analyzed.

For signal analysis and/or frequency control and/or signal generation of the exciter arrangement, a digital signal processor can also be used. Any of the components of the FIG. 1 system can be combined and/or separated into separate components as desired.

The determination of the natural frequencies and adjustment to the latter can be a very prompt and very precise procedure. For example, the resolution and the noise level of the measurement signal for this process can be less than 0.0001 Hz.

Frequency instabilities and other nonlinear effects can be prevented because the sinusoidal feedback signal from the sensor which is referenced to the noise level is not used as a trigger signal.

The suggested frequency control with the "Ψ=0" condition for all values of the attenuation parameter D can ensure that the amplitude of the analyzed signal, i.e., the velocity amplitude $$V = \frac{bF}{d}\cos(\psi)$$

is maximum.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. Process for operating a measurement device of the vibration type, comprising:
    exciting at least one vibration-capable part of a measurement device to vibration using an adjustable excitation frequency ω of at least one exciter arrangement;
    determining from vibration parameters, a measurement quantity of a measurement medium within the at least one vibration-capable part of the measurement device, wherein a time-dependent force f(t)=F sin(ωt)+g(t) with at least one sinusoidal component having a force amplitude F, the adjustable excitation frequency ω, and with a possible extraneous time varying force factor g(t), acts on the at least one vibration-capable part of the measurement device and is driven using the exciter arrangement, and wherein a response signal of the at least one vibration-capable part is measured and a phase shift Ψ between the response signal and a signal component of the force f which oscillates with a frequency ω is determined; and
    using the phase shift Ψ as an input for a frequency controller so that the excitation frequency ω is automatically adjusted as a function of Ψ.

2. Process as claimed in claim 1, comprising:
    using a mathematical function m(ψ) as an input for the frequency controller so that the excitation frequency ω is automatically changed as a function of Ψ.

3. Process as claimed in claim 2, comprising:
    using a mathematical function m(Ψ)=tan(Ψ) as an input for frequency controller.

4. Process as claimed in claim 3, wherein the frequency controller is operated with a Proportional-Integral-Derivative (PID) control.

5. Process as claimed in claim 4, wherein the PID control is operated as follows:

$$\omega_{t+\Delta t} = \omega_t + \Delta\omega$$

with $$\Delta\omega = P*m(\psi_t) + I*\sum_{\tau}^{t-\Delta t} m(\psi_\tau) + D*[m(\psi_t) - m(\psi_{t-\Delta t})],$$

wherein P, I and D are constants for a given measurement.

6. Process as claimed in claim 5, wherein the frequency controller is operated from a neural network based on fuzzy logic or with an actuator.

7. Process as claimed in claim 6, wherein a drive of the exciter arrangement is a plunger coil, a current through the coil being adjustable.

8. Process as claimed in claim 7, comprising:
    a vibration sensor configured as a plunger coil to produce the response signal, an induced voltage being a sensor value to be analyzed.

9. Process as claimed in claim 1, wherein the response signal is a time dependent velocity v(t)=V sin(ωt+ψ)+h(t) of the vibration capable part, with at least one sinusoidal component having a velocity amplitude V, the adjustable excitation frequency ω, and with a possible extraneous time varying velocity factor h(t).

10. Process as claimed in claim 1, wherein the frequency controller is operated with a Proportional-Integral-Derivative (PID) control.

11. Process as claimed in claim 10, wherein the PID control is operated as follows:

$$\omega_{t+\Delta t} = \omega_t + \Delta\omega$$

with $$\Delta\omega = P*m(\psi_t) + I*\sum_{\tau}^{t-\Delta t} m(\psi_\tau) + D*[m(\psi_t) - m(\psi_{t-\Delta t})],$$

wherein P, I and D are constants for a given measurement.

12. Process as claimed in claim 1, wherein the frequency controller is operated from a neural network based on fuzzy logic or with an actuator.

13. Process as claimed in claim 1, wherein a drive of the exciter arrangement is a plunger coil, a current through the coil being adjustable.

14. Measurement device of the vibration type comprising:
    at least one exciter arrangement for generating an adjustable excitation frequency ω;
    at least one vibration-capable part for containing a measurement medium, wherein the exciter arrangement and the vibration-capable part are configured such that a time-dependent force f(t)=F sin(ωt)+g(t) with at least one sinusoidal component having a force amplitude F, the adjustable frequency ω, and with a possible extraneous time varying force factor g(t), which is driven by the exciter arrangement, acts upon the at least one vibration-capable part; and
    a sensor for measuring a response signal of the vibration-capable part to determine a phase shift Ψ between the response signal and a signal component of the force f which oscillates with the frequency ω, the measurement device being configured such that the phase shift Ψ is input to a frequency controller of the exciter arrangement so that the excitation frequency ω will be automatically adjusted as a function of Ψ.

15. Measurement device as claimed in claim 14, wherein the frequency controller is operated from a neural network based on fuzzy logic or with an actuator.

16. Measurement device as claimed in claim 14, wherein the drive is a plunger coil, a current through the coil being adjustable.

17. Process for operating a measurement device of the vibration type, comprising:

exciting at least one vibration-capable part of a measurement device to vibration according to an adjustable excitation frequency ω by applying a time-dependent force f(t)=F sin(ωt)+g(t) with at least one sinusoidal component having a force amplitude ω, the adjustable excitation frequency w, and with a possible extraneous time varying force factor g(t), to the at least one vibration-capable part;

determining, by the measurement device, a measurement quantity of a measurement medium of the vibration-capable part by measuring a response signal of the vibration-capable part;

determining a phase shift Ψ between the response signal and a signal component of the force f which oscillates with a frequency ω; and adjusting the frequency ω as a function of the phase shift Ψ.

* * * * *